US009102848B2

(12) United States Patent
Hamilton et al.

(10) Patent No.: US 9,102,848 B2
(45) Date of Patent: Aug. 11, 2015

(54) ENVIRONMENTALLY FRIENDLY, POLYMER DISPERSION-BASED COATING FORMULATIONS AND METHODS OF PREPARING AND USING SAME

(75) Inventors: Andrea Hamilton, Charlotte, NC (US); John Kelly, Gastonia, NC (US)

(73) Assignee: BASF SE, Ludwigshafen (DE)

( * ) Notice: Subject to any disclaimer, the term of this patent is extended or adjusted under 35 U.S.C. 154(b) by 189 days.

(21) Appl. No.: 13/406,911

(22) Filed: Feb. 28, 2012

(65) Prior Publication Data

US 2012/0220705 A1 Aug. 30, 2012

Related U.S. Application Data

(60) Provisional application No. 61/447,398, filed on Feb. 28, 2011.

(51) Int. Cl.
| C09D 133/12 | (2006.01) |
| C09D 133/08 | (2006.01) |
| C09D 133/26 | (2006.01) |
| C08K 5/41 | (2006.01) |
| C08K 5/521 | (2006.01) |

(52) U.S. Cl.
CPC ............ *C09D 133/08* (2013.01); *C09D 133/26* (2013.01); *C08K 5/41* (2013.01); *C08K 5/521* (2013.01); *C08L 2201/54* (2013.01); *C08L 2312/00* (2013.01)

(58) Field of Classification Search
None
See application file for complete search history.

(56) References Cited

U.S. PATENT DOCUMENTS

| 3,607,486 A | 9/1971 | Jacks et al. |
| 4,011,388 A | 3/1977 | Murphy et al. |
| 4,230,810 A | 10/1980 | Lattime |
| 4,477,623 A | 10/1984 | Pons et al. |
| 4,611,087 A | 9/1986 | Yamashita et al. |
| 4,612,343 A | 9/1986 | Okuzono et al. |
| 4,686,254 A | 8/1987 | Lochhead et al. |
| 4,814,514 A | 3/1989 | Yokota et al. |
| 4,900,615 A | 2/1990 | Kissell et al. |
| 4,939,283 A | 7/1990 | Yokota et al. |
| 4,943,612 A | 7/1990 | Morita et al. |
| 4,952,650 A | 8/1990 | Young et al. |
| 4,966,791 A | 10/1990 | Kissell et al. |
| 4,987,695 A | 1/1991 | Preiser |
| 5,084,505 A | 1/1992 | Biale |
| 5,094,998 A | 3/1992 | Hoshino et al. |
| 5,133,898 A | 7/1992 | Fock et al. |
| 5,168,087 A | 12/1992 | Li Bassi et al. |
| 5,173,534 A | 12/1992 | Biale |
| 5,207,954 A | 5/1993 | Lewis et al. |
| 5,268,437 A | 12/1993 | Holy et al. |
| 5,273,676 A | 12/1993 | Boeckh et al. |
| 5,275,650 A | 1/1994 | Mongoin et al. |
| 5,308,890 A | 5/1994 | Snyder |
| 5,326,814 A | 7/1994 | Biale |
| 5,332,854 A | 7/1994 | Yokota et al. |
| 5,338,485 A | 8/1994 | Fock et al. |
| 5,340,870 A * | 8/1994 | Clinnin et al. ............... 524/522 |
| 5,348,998 A | 9/1994 | Ito et al. |
| 5,380,784 A | 1/1995 | Usuki et al. |
| 5,389,722 A | 2/1995 | Nagasuna et al. |
| 5,391,624 A | 2/1995 | Rasoul et al. |
| 5,414,041 A | 5/1995 | Larson et al. |
| 5,498,659 A | 3/1996 | Esser |
| 5,506,325 A | 4/1996 | Swarup et al. |
| 5,534,577 A | 7/1996 | Namba et al. |
| 5,637,142 A | 6/1997 | Kubo et al. |
| 5,661,206 A | 8/1997 | Tanaka et al. |
| 5,679,735 A | 10/1997 | Geissler et al. |
| 5,679,835 A | 10/1997 | Inden et al. |
| 5,686,523 A | 11/1997 | Chen et al. |
| 5,707,445 A | 1/1998 | Yamato et al. |
| 5,721,330 A | 2/1998 | Ma |
| 5,726,268 A | 3/1998 | Sakamoto |
| 5,859,112 A | 1/1999 | Overbeek et al. |

(Continued)

FOREIGN PATENT DOCUMENTS

| CA | 2180989 | 6/2003 |
| DE | 3811102 | 10/1988 |

(Continued)

OTHER PUBLICATIONS

Dectrol OC-70 Phosphate Ester Surfactant Product Data Sheet (2011).*
ADEKA REASOAP Material Safety Data Sheet, ADEKA Corp., revised Sep. 10, 2006, 7 pages.
ADEKA, "New Reactive Surfactant: Adeka reasoap ER/SR Series," Asahi Denka Co., Ltd. Jan. 29, 2003, 4 pp.
Mayer, H., "Masonry Protection with Silanes, Siloxanes and Silicone Resins," Surface Coatings International, JOCCA, vol. 81, No. 2, Feb. 1998, pp. 89-93.
Mizutani, Tsutomu, et al., "Preparation of Spherical Nanocomposites Consisting of Silica Core and Polyacrylate Shell by Emulsion Polymerization," Journal of Applied Polymer Science, vol. 99, 2006, pp. 659-669.

(Continued)

*Primary Examiner* — Ling Choi
*Assistant Examiner* — Catherine S Branch
(74) *Attorney, Agent, or Firm* — Meunier Carlin & Curfman LLC

(57) ABSTRACT

Environmentally friendly, high performance coating formulations and methods for their preparation are described. The coating formulations can be prepared as aqueous dispersions. The aqueous dispersions include a plurality of multiphase polymer particles and a C8-C18 alkyl alcohol alkoxylated phosphate ester surfactant. The multiphase particles include an acrylic-based copolymer derived from one or more (meth) acrylate monomers and at least one copolymerizable surfactant. Optionally, the acrylic-based copolymer is further derived from one or more acid monomers, one or more amide monomers, and/or one or more molecular weight regulators. Further described herein are products prepared from the aqueous dispersions, such as for high gloss and satin paint compositions, that can have a low VOC content.

31 Claims, No Drawings

(56) References Cited

U.S. PATENT DOCUMENTS

| | | |
|---|---|---|
| 5,895,801 A | 4/1999 | Lee |
| 5,911,820 A | 6/1999 | Satoh et al. |
| 5,925,184 A | 7/1999 | Hirata et al. |
| 5,928,783 A | 7/1999 | Phan et al. |
| 5,962,571 A | 10/1999 | Overbeek et al. |
| 5,969,037 A | 10/1999 | Hatano et al. |
| 5,977,242 A | 11/1999 | Origuchi et al. |
| 5,998,543 A | 12/1999 | Collins et al. |
| 6,005,042 A | 12/1999 | Desor et al. |
| 6,028,155 A | 2/2000 | Collins et al. |
| 6,048,953 A | 4/2000 | Kawashima et al. |
| 6,087,418 A | 7/2000 | Yamashita et al. |
| 6,103,788 A | 8/2000 | Harui et al. |
| 6,140,435 A | 10/2000 | Zanotti-Russo |
| 6,147,165 A | 11/2000 | Lee et al. |
| 6,156,860 A | 12/2000 | Tanaka et al. |
| 6,166,112 A | 12/2000 | Hirata et al. |
| 6,174,980 B1 | 1/2001 | Hirata et al. |
| 6,187,841 B1 | 2/2001 | Tanaka et al. |
| 6,201,089 B1 | 3/2001 | Carter |
| 6,214,467 B1 | 4/2001 | Edwards et al. |
| 6,214,958 B1 | 4/2001 | Le-Khac et al. |
| 6,225,389 B1 | 5/2001 | Saint Victor |
| 6,239,241 B1 | 5/2001 | Yamato et al. |
| 6,258,162 B1 | 7/2001 | Kawakami et al. |
| 6,262,144 B1 | 7/2001 | Zhao et al. |
| 6,264,739 B1 | 7/2001 | Yamato et al. |
| 6,265,495 B1 | 7/2001 | Hirata et al. |
| 6,271,326 B1 | 8/2001 | Nishikawa et al. |
| 6,294,015 B1 | 9/2001 | Yamashita et al. |
| 6,297,328 B1 | 10/2001 | Collins et al. |
| 6,313,244 B1 | 11/2001 | Tanaka et al. |
| 6,326,446 B2 | 12/2001 | Carter |
| 6,329,461 B1 | 12/2001 | Akiyama et al. |
| 6,376,581 B1 | 4/2002 | Tanaka et al. |
| 6,384,168 B1 | 5/2002 | Tanaka et al. |
| 6,388,038 B1 | 5/2002 | Hirata et al. |
| 6,417,269 B1 | 7/2002 | Murray et al. |
| 6,462,110 B2 | 10/2002 | Satoh et al. |
| 6,471,885 B2 | 10/2002 | Chiang et al. |
| 6,476,108 B1 | 11/2002 | Mogi et al. |
| 6,489,387 B2 | 12/2002 | Mallya et al. |
| 6,489,396 B2 | 12/2002 | Nakamura et al. |
| 6,506,837 B2 | 1/2003 | Destarac et al. |
| 6,524,679 B2 | 2/2003 | Hauber et al. |
| 6,527,850 B2 | 3/2003 | Schwartz et al. |
| 6,534,590 B1 | 3/2003 | Aso et al. |
| 6,534,597 B2 | 3/2003 | Adam et al. |
| 6,538,047 B1 | 3/2003 | Miyabayashi |
| 6,545,083 B1 | 4/2003 | Hirata et al. |
| 6,555,641 B2 | 4/2003 | Parker et al. |
| 6,569,234 B2 | 5/2003 | Yamashita et al. |
| 6,569,949 B1 | 5/2003 | Lee et al. |
| 6,569,976 B2 | 5/2003 | Baxter et al. |
| 6,576,051 B2 | 6/2003 | Bardman et al. |
| 6,593,412 B1 | 7/2003 | Rabasco et al. |
| 6,602,949 B2 | 8/2003 | Furukawa et al. |
| 6,605,662 B2 | 8/2003 | Zhao et al. |
| 6,620,890 B1 | 9/2003 | Yamashita et al. |
| 6,624,243 B2 | 9/2003 | Stark et al. |
| 6,638,998 B2 | 10/2003 | Zhao et al. |
| 6,652,867 B1 | 11/2003 | Vincent et al. |
| 6,656,266 B1 | 12/2003 | Barlet-Gouedard et al. |
| 6,673,885 B1 | 1/2004 | Shibata et al. |
| 6,683,145 B2 | 1/2004 | Grandhee |
| 6,699,931 B2 | 3/2004 | Kuo et al. |
| 6,713,553 B2 | 3/2004 | Gonnon et al. |
| 6,716,943 B2 | 4/2004 | Tanaka et al. |
| 6,723,786 B2 | 4/2004 | Husemann et al. |
| 6,723,813 B2 | 4/2004 | Asai et al. |
| 6,727,315 B2 | 4/2004 | Yamamoto et al. |
| 6,737,493 B2 | 5/2004 | Mochizuki et al. |
| 6,743,834 B2 | 6/2004 | Yokoyama et al. |
| 6,759,463 B2 | 7/2004 | Lorah et al. |
| 6,770,354 B2 | 8/2004 | Randall et al. |
| 6,780,924 B2 | 8/2004 | Shih et al. |
| 6,815,513 B2 | 11/2004 | Le-Khac et al. |
| 6,841,655 B1 | 1/2005 | Gota et al. |
| 6,869,988 B2 | 3/2005 | Schwartz et al. |
| 6,878,321 B2 | 4/2005 | Hauber et al. |
| 6,900,275 B2 | 5/2005 | Tomita et al. |
| 6,905,814 B1 | 6/2005 | Aubay et al. |
| 6,919,388 B2 | 7/2005 | Nishikawa et al. |
| 6,921,801 B2 | 7/2005 | Collette et al. |
| 6,933,415 B2 | 8/2005 | Zhao et al. |
| 6,946,505 B2 | 9/2005 | Yuasa et al. |
| 6,956,082 B1 | 10/2005 | Johnson et al. |
| 6,960,624 B2 | 11/2005 | Gonnon et al. |
| 6,964,991 B2 | 11/2005 | Chen et al. |
| 6,969,734 B1 | 11/2005 | Pressley et al. |
| 7,008,977 B2 | 3/2006 | Sakai et al. |
| 7,098,250 B2 | 8/2006 | Sawada et al. |
| 7,105,593 B2 | 9/2006 | Solomon et al. |
| 7,115,682 B2 | 10/2006 | Guo et al. |
| 7,144,944 B2 | 12/2006 | Murase et al. |
| 7,217,443 B2 | 5/2007 | Bobsein et al. |
| 7,265,165 B2 | 9/2007 | Ohkubo et al. |
| 7,285,590 B2 | 10/2007 | Holub et al. |
| 7,297,328 B2 | 11/2007 | Löffler et al. |
| 7,339,002 B2 | 3/2008 | Guo et al. |
| 7,378,479 B2 | 5/2008 | Tamareselvy et al. |
| 7,393,888 B2 | 7/2008 | Yoshimura |
| 7,445,849 B2 | 11/2008 | Apitz et al. |
| 7,612,126 B2 | 11/2009 | Roschmann et al. |
| 7,705,081 B2 | 4/2010 | Porzio et al. |
| 7,705,082 B2 | 4/2010 | Porzio et al. |
| 7,776,975 B2 | 8/2010 | Blankenship et al. |
| 7,893,131 B2 | 2/2011 | Matthews et al. |
| 7,989,545 B2 | 8/2011 | Farwaha et al. |
| 2002/0065208 A1 | 5/2002 | Aubay et al. |
| 2002/0103316 A1 | 8/2002 | Tanaka et al. |
| 2002/0123588 A1 | 9/2002 | Adam et al. |
| 2002/0157573 A1 | 10/2002 | Pellett |
| 2002/0168533 A1 | 11/2002 | Taylor et al. |
| 2003/0031719 A1 | 2/2003 | Kipp et al. |
| 2003/0134973 A1 | 7/2003 | Chen et al. |
| 2003/0162890 A1 | 8/2003 | Kalantar et al. |
| 2003/0212195 A1 | 11/2003 | Matsumoto et al. |
| 2004/0048963 A1 | 3/2004 | Sawada et al. |
| 2004/0052746 A1 | 3/2004 | Tamareselvy et al. |
| 2004/0054111 A1 | 3/2004 | Kalantar et al. |
| 2004/0075074 A1 | 4/2004 | Kubota et al. |
| 2004/0109836 A1 | 6/2004 | Löffler et al. |
| 2004/0127607 A1 | 7/2004 | Schober et al. |
| 2004/0152379 A1 | 8/2004 | McLarty, III et al. |
| 2004/0170873 A1 | 9/2004 | Smith |
| 2004/0185231 A1 | 9/2004 | Dimmick |
| 2004/0209074 A1 | 10/2004 | Randall et al. |
| 2004/0221395 A1 | 11/2004 | Biver et al. |
| 2004/0235687 A1 | 11/2004 | Shiba et al. |
| 2004/0242760 A1 | 12/2004 | Shibai et al. |
| 2005/0075416 A1 | 4/2005 | Miyabayashi |
| 2005/0131176 A1 | 6/2005 | Zhao |
| 2005/0202742 A1 | 9/2005 | Smith et al. |
| 2005/0202997 A1 | 9/2005 | Hanazawa et al. |
| 2005/0222301 A1 | 10/2005 | Yuasa et al. |
| 2005/0229519 A1 | 10/2005 | Colbert et al. |
| 2005/0250887 A1 | 11/2005 | Yang et al. |
| 2005/0256257 A1 | 11/2005 | Betremieux et al. |
| 2005/0266225 A1 | 12/2005 | Currier et al. |
| 2005/0266238 A1 | 12/2005 | Amano et al. |
| 2006/0024494 A1 | 2/2006 | Amano et al. |
| 2006/0035112 A1 | 2/2006 | Veeramasuneni et al. |
| 2006/0057371 A1 | 3/2006 | Kobayashi et al. |
| 2006/0063868 A1 | 3/2006 | Janmaat et al. |
| 2006/0115669 A1 | 6/2006 | Shinohara et al. |
| 2006/0135684 A1 | 6/2006 | Killilea et al. |
| 2006/0135686 A1 | 6/2006 | Killilea et al. |
| 2006/0178494 A1 | 8/2006 | Pabon et al. |
| 2006/0188714 A1 | 8/2006 | Tetsumoto et al. |
| 2006/0205865 A1 | 9/2006 | Kim et al. |
| 2006/0235131 A1 | 10/2006 | Hughes et al. |
| 2006/0240236 A1 | 10/2006 | Bland et al. |
| 2006/0277854 A1 | 12/2006 | Egan |

(56) References Cited

U.S. PATENT DOCUMENTS

| | | |
|---|---|---|
| 2006/0278267 A1 | 12/2006 | Miyazawa |
| 2007/0012221 A1 | 1/2007 | Maeta et al. |
| 2007/0105982 A1 | 5/2007 | Roschmann et al. |
| 2007/0123637 A1 | 5/2007 | Pernecker et al. |
| 2007/0135559 A1 | 6/2007 | Fukumon et al. |
| 2007/0190172 A1* | 8/2007 | Bobbert ........................ 424/616 |
| 2007/0287019 A1 | 12/2007 | Chen et al. |
| 2007/0299180 A1 | 12/2007 | Joecken |
| 2008/0057346 A1 | 3/2008 | Peuramaki |
| 2008/0069793 A1 | 3/2008 | Löffler et al. |
| 2008/0139737 A1 | 6/2008 | Alderfer et al. |
| 2008/0245012 A1 | 10/2008 | Boisvert et al. |
| 2008/0245259 A1 | 10/2008 | Chowdhry et al. |
| 2009/0043035 A1 | 2/2009 | Cabrera |
| 2009/0143528 A1 | 6/2009 | Mestach et al. |
| 2009/0163619 A1* | 6/2009 | Hsu et al. ........................ 523/335 |
| 2009/0171005 A1 | 7/2009 | Finegan et al. |
| 2009/0326135 A1 | 12/2009 | Nair et al. |
| 2010/0062264 A1 | 3/2010 | Hayes et al. |
| 2010/0113646 A1 | 5/2010 | Bardman et al. |

FOREIGN PATENT DOCUMENTS

| | | |
|---|---|---|
| EP | 422120 A1 | 4/1991 |
| EP | 0725044 | 7/1996 |
| EP | 1369434 | 12/2003 |
| EP | 1712573 A1 | 10/2006 |
| EP | 1798258 | 6/2007 |
| EP | 1911808 | 4/2008 |
| GB | 1242290 | 8/1971 |
| GB | 2264114 | 8/1993 |
| GB | 2319522 | 5/1998 |
| JP | 59203742 | 11/1984 |
| JP | 08217505 | 8/1996 |
| JP | 11209560 | 8/1999 |
| JP | 03218956 | 8/2001 |
| JP | 2002145969 | 5/2002 |
| JP | 2004210919 | 7/2004 |
| JP | 2004217782 | 8/2004 |
| JP | 2009256481 | 11/2009 |
| WO | 89/12618 | 12/1989 |
| WO | 9711996 A1 | 4/1997 |
| WO | 98/28240 | 7/1998 |
| WO | 00/22016 | 4/2000 |
| WO | 00/63294 | 10/2000 |
| WO | 02/12144 | 2/2002 |
| WO | 2004/020477 | 3/2004 |
| WO | 2005/095532 | 10/2005 |
| WO | 2009/095569 | 8/2009 |
| WO | 2010/026065 | 3/2010 |

OTHER PUBLICATIONS

NeoCAR® Acrylics 7657 and 7658, NeoCAR® Acrylics: The Next Step in Technology and Performance, Union Carbide, 1998, 16 pages.

Product Bulletin Vv 1.2, VeoVa™ Monomers Applications and Advantages, Hexion Specialty Chemicals, 2007, 4 pages.

Product Data Sheet, VeoVa™ Monomer 10, Resolution Performance Products, Reissued issued Oct. 2002, 3 pages.

VeoVa™ Vinyl Esters, Hexion Specialty Chemicals, retrieved from http://www.hexion.com/Products/ProductLiterature.aspx?id=693 on May 26, 2008, 1 page.

Willenbacher, N., et al., "New Laboratory Test to Characterize Immobilization and Dewatering of Paper Coating Colors," TAPPI Journal, vol. 82, No. 8, 1999, pp. 167-174.

International Preliminary Report on Patentability and Written Opinion, dated Mar. 8, 2011, in related International Application No. PCT/EP2009/060850.

International Search Report, dated Feb. 24, 2010, in related International Application No. PCT/EP2009/060850.

International Preliminary Report on Patentability and Written Opinion, dated Sep. 25, 2012, in corresponding International Application No. PCT/EP2011/054190.

International Search Report, dated Jul. 7, 2011, in corresponding International Application No. PCT/EP2011/054190.

Related U.S. Appl. No. 13/634,738, filed Nov. 5, 2011.

Non-Final Office Action dated Sep. 19, 2013, in related U.S. Appl. No. 13/634,738.

Final Office Action dated Mar. 6, 2014, in related U.S. Appl. No. 13/634,738.

Related U.S. Appl. No. 12/205,177 (issued as U.S. Patent No. 8,592,040), filed Sep. 5, 2008.

Non-Final Office Action mailed May 17, 2011, in related U.S. Appl. No. 12/205,177.

Final Office Action mailed Nov. 2, 2011, in related U.S. Appl. No. 12/205,177.

Non-Final Office Action mailed Jun. 28, 2012, in related U.S. Appl. No. 12/205,177.

Final Office Action mailed Feb. 12, 2013, in related U.S. Appl. No. 12/205,177.

* cited by examiner

ENVIRONMENTALLY FRIENDLY, POLYMER DISPERSION-BASED COATING FORMULATIONS AND METHODS OF PREPARING AND USING SAME

CROSS-REFERENCE TO RELATED APPLICATIONS

This application claims priority to U.S. Provisional Application No. 61/447,398, filed Feb. 28, 2011, which is incorporated herein by reference in its entirety.

BACKGROUND

Coated surfaces, especially those coated with modern low VOC coatings containing 100 g/L VOC or less, such as moldings and panels often become visibly discolored after contact with water repeatedly or over extended periods of time. This problem is enhanced when high polymer content coatings are used on the surfaces. Other issues that can occur with painted surfaces are blistering and surfactant leaching, wherein water soluble components are extracted from the coatings and deposited on the coated surface. Minimizing the amount of water-soluble ingredients has been used to reduce surfactant leaching. However, the water-soluble components are generally substituted with volatile organic compounds (VOCs), resulting in an environmentally undesirable product.

SUMMARY

Coating formulations and methods for their preparation are described. The coating formulations can be prepared from aqueous dispersions. The aqueous dispersions include a plurality of multiphase polymer particles and a C8-C18 alkyl alcohol alkoxylated phosphate ester surfactant. The multiphase particles include an acrylic-based copolymer derived from one or more (meth)acrylate monomers and at least one copolymerizable surfactant. In some embodiments, the aqueous dispersion can further include an unreacted portion of the at least one copolymerizable surfactant. Optionally, the acrylic-based copolymer is further derived from one or more acid monomers, one or more amide monomers, and/or one or more molecular weight regulators.

In some embodiments, the acrylic-based copolymer is derived from greater than 0.5% by weight of the at least one copolymerizable surfactant. For example, the acrylic-based copolymer can be derived from greater than 1.0% by weight of the at least one copolymerizable surfactant. In some examples, the at least one copolymerizable surfactant has the following structure of formula I, or a salt thereof:

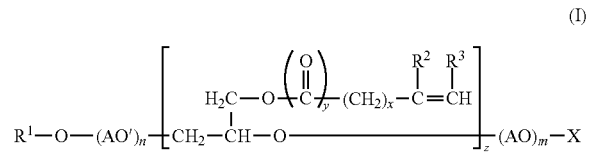

(I)

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, $R^2$ and $R^3$ each independently represents a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000.

In some embodiments, the alkoxylated phosphate ester surfactant is a C12-C15 alkyl alcohol phosphate ester surfactant having from 1 to 70 alkoxylate groups. For example, the alkoxylated phosphate ester surfactant can be a tridecyl alcohol phosphate ester surfactant having from 10 to 40 ethoxylate groups (e.g., greater than 20 to 40). The phosphate ester surfactant is optionally in free acid form.

The acrylic-based copolymer can be derived from greater than 85% by weight of said one or more (meth)acrylate monomers (e.g., from 90% by weight or greater of said one or more (meth)acrylate monomers). In some embodiments, the one or more (meth)acrylate monomers include methyl methacrylate and/or butyl acrylate. In some embodiments, the one or more (meth)acrylate monomers include a crosslinkable (meth)acrylate monomer, such as, for example, acetoacetoxyethyl methacrylate (AAEM). Optionally, the acrylic-based copolymer can be further derived from greater than 0% by weight to 5% by weight of said one or more acid monomers. Examples of the one or more acid monomers include one or more of acrylic acid, methacrylic acid, and itaconic acid.

The acrylic-based copolymer can be derived from greater than 0% by weight to 5% by weight of one or more amide monomers. The one or more amide monomers include, for example, acrylamide and methacrylamide. In some embodiments, the acrylic-based copolymer is derived from greater than 0% by weight to 0.3% by weight of one or more molecular weight regulators that can include tert-dodecyl mercaptan.

In some embodiments, the acrylic-based copolymer is derived from 20-60% by weight methyl methacrylate, 20-60% by weight butyl acrylate, 0-5% by weight acid monomers, 0-5% by weight amide monomers, 0-8% by weight crosslinkable (meth)acrylate monomers, 0-0.3% by weight molecular weight regulators, and greater than 0 to 10% copolymerizable surfactant. For example, the acrylic-based copolymer can be derived from 40-50% by weight methyl methacrylate, 40-55% by weight butyl acrylate, greater than 0 to 5% by weight acid monomers, 0-5% by weight amide monomers, 0-8% by weight crosslinkable (meth)acrylate monomers, 0-0.3% by weight molecular weight regulators, and 1 to 10% copolymerizable surfactant. The acid monomers in the acrylic-based copolymers can include, for example, 0-2.5% by weight acrylic acid and 0-2.5% by weight itaconic acid.

The multiphase particles described herein can have a core phase and a shell phase. In some embodiments, the core phase and the shell phase each comprise greater than 85% of the one or more (meth)acrylate monomers. In some embodiments, the ratio of butyl acrylate to methyl methacrylate in the core phase is 1:1.5 to 5:1 and the ratio of butyl acrylate to methyl methacrylate in the shell phase is 0 to 1:2. The core phase in the multiphase particle can have a $T_g$ of −20 to 30° C. (e.g., −10 to 10° C.) and the shell phase can have a $T_g$ of 60 to 100° C. (e.g., 70 to 90° C.).

Also described herein are coating formulations comprising the aqueous dispersions described herein and one or more fillers. In some embodiments, the coating formulation is a satin or high gloss paint. The one or more fillers can include, for example, one or more of silica, nepheline syenite, calcium carbonate, clay, and titanium dioxide. The coating formulation can have a low volatile organic compound (VOC) content. In some embodiments, the coating formulation comprises less than 100 g/l VOC's (e.g., less than 50 g/l VOC's or less than 10 g/l VOC's).

Further described herein are methods of producing an aqueous dispersion comprising a plurality of multiphase copolymer particles. The methods comprise polymerizing one or more (meth)acrylate monomers, optionally one or more acid monomers, optionally one or more amide monomers, optionally one or more molecular weight regulators, and at least one copolymerizable surfactant, or salt thereof, in an aqueous medium and adding a C8-C18 alkyl alcohol alkoxylated phosphate ester surfactant to the aqueous medium. The polymerizing step can occur in more than one phase.

The details of one or more embodiments are set forth in the description below. Other features, objects, and advantages will be apparent from the description and from the claims.

DETAILED DESCRIPTION

Coating formulations and methods for their preparation and use are described herein. The coating formulations can be prepared as aqueous dispersions. The aqueous dispersions can include a plurality of multiphase polymer particles and a C8-C18 alkyl alcohol alkoxylated phosphate ester surfactant.

As used herein, the term "multiphase" means that the polymer particles include two or more phases. For example, the polymer particles can include two or more phases, three or more phases, or four or more phases. In some examples, the polymer particles are core/shell polymer particles having a core comprising a first copolymer and a shell formed over the core comprising a second copolymer. The first polymer and the second polymer can include an acrylic-based copolymer. The acrylic-based copolymer is derived from one or more (meth)acrylate monomers, at least one copolymerizable surfactant, and optionally one or more additional monomers.

The acrylic-based copolymers described herein can be derived from greater than 85% by weight of the one or more (meth)acrylate monomers (e.g., from 86% by weight or greater, from 87% by weight or greater, from 88% by weight or greater, from 89% by weight or greater, from 90% by weight or greater, from 91% by weight or greater, from 92% by weight or greater, from 93% by weight or greater, from 94% by weight or greater, from 95% by weight or greater, from 96% by weight or greater, from 97% by weight or greater, from 98% by weight or greater, or from 99% by weight of one or more (meth)acrylate monomers) based on the total weight of monomers. As used herein, the term "(meth)acrylate monomer" includes acrylate, methacrylate, diacrylate, and dimethacrylate monomers. The (meth)acrylate monomers can include esters of α,β-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{12}$, $C_1$-$C_8$, or $C_1$-$C_4$ alkanols). In some embodiments, the copolymer is derived from two or more or three or more (meth)acrylate monomers. Examples of (meth)acrylate monomers suitable for use in the copolymers described herein include butyl acrylate, methyl methacrylate, 2-ethylhexyl acrylate, ethyl acrylate, methyl acrylate, hydroxyethyl(meth)acrylate, hydroxypropyl (meth)acrylate, and methylpolyglycol acrylate. In some embodiments, the copolymer is not derived from polyalkylene glycol methacrylate monomers. The one or more (meth)acrylate monomers can further include a crosslinkable (meth)acrylate monomer. The crosslinkable (meth)acrylate monomers can include, for example, acetoacetoxyethyl methacrylate, acetoacetoxyethyl acrylate, acetoacetoxypropyl methacrylate, acetoacetoxybutyl methacrylate, 2,3-di(acetoacetoxy)propyl methacrylate, 1,4-butanediol diacrylate, ureidoethyl(meth)acrylate, alkylene glycol diacrylates and dimethacrylates (e.g., ethylene glycol diacrylate, 1,3-butylene glycol diacrylate, 1,4-butylene glycol diacrylate and propylene glycol diacrylate), vinyl methacrylate, vinyl acrylate, allyl methacrylate, allyl acrylate, urethane methacrylate, and mixtures of these.

The one or more additional monomers used to prepare the acrylic-based copolymer can optionally include one or more acid monomers. In some examples, the acrylic-based copolymer is derived from greater than 0% by weight to 5% by weight of the one or more acid monomers based on the total weight of the monomers. For example, the acrylic-based copolymer can be derived from greater than 0.5% by weight, greater than 1% by weight, greater than 1.5% by weight, greater than 2% by weight, greater than 2.5% by weight, greater than 3% by weight, greater than 3.5% by weight, greater than 4% by weight, or greater than 4.5% by weight of the one or more acid monomers. Examples of suitable acid monomers for use in the copolymers described herein include α,β-monoethylenically unsaturated mono- and dicarboxylic acids such as acrylic acid, methacrylic acid, itaconic acid, crotonic acid, dimethacrylic acid, ethylacrylic acid, allylacetic acid, vinylacetic acid, maleic acid, fumaric acid, mesaconic acid, methylenemalonic acid, citraconic acid, and mixtures of these. In some embodiments, the acid monomers for use in the copolymers described herein include acrylic acid, methacrylic acid, itaconic acid, and mixtures of these.

The one or more additional monomers can include amide monomers. The amide monomers can be included in the acrylic-based copolymers in an amount of from greater than 0% by weight to 5% by weight based on the total weight of the monomers. For example, the acrylic-based copolymer can be derived from greater than 0.5% by weight, greater than 1% by weight, greater than 1.5% by weight, greater than 2% by weight, greater than 2.5% by weight, greater than 3% by weight, greater than 3.5% by weight, greater than 4% by weight, or greater than 4.5% by weight of the one or more amide monomers. Suitable amide monomers can include acrylamide, alkyl-substituted acrylamide monomers (e.g., methacrylamide, N-tert-butylacrylamide, and N-methyl (meth)acrylamide), N-methylol acrylamide, N-methylol methacrylamide, alkylaminoalkyl(meth)acrylamide, 2-dimethylaminoethyl(meth)acrylamide, 3-dimethylaminopropyl (meth)acrylamide, 3-trimethylammoniumpropyl(meth)acrylamide chloride, diacetonacrylamide, methylenebisacrylamide, and mixtures of these.

Other suitable monomers for use in the acrylic-based copolymers described herein can include conjugated dienes (e.g., 1,3-butadiene or isoprene); α,β-monoethylenically unsaturated mono- and dicarboxylic acid anhydrides (e.g., maleic anhydride, itaconic anhydride, and methylmalonic anhydride); (meth)acrylonitrile; vinyl and vinylidene halides (e.g., vinyl chloride and vinylidene chloride); vinyl esters of $C_1$-$C_{18}$ mono- or dicarboxylic acids (e.g., vinyl acetate, vinyl propionate, vinyl n-butyrate, vinyl laurate and vinyl stearate); $C_1$-$C_4$ hydroxyalkyl esters of $C_3$-$C_6$ mono- or dicarboxylic acids, especially of acrylic acid, methacrylic acid or maleic acid, or their derivatives alkoxylated with from 2 to 50 mol of ethylene oxide, propylene oxide, butylene oxide or mixtures thereof, or esters of these acids with $C_1$-$C_{18}$ alcohols alkoxylated with from 2 to 50 mol of ethylene oxide, propylene oxide, butylene oxide or mixtures thereof.

Additional monomers or co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., the corresponding alkali metal or ammonium salts of allylsulfonic acid, methallylsulfonic acid, vinylsulfonic acid, allyloxybenzenesulfonic acid, 2-acrylamido-2-methylpropanesulfonic acid; sulfopropyl acrylate; and sulfopropyl methacrylate); dimethyl vinylphosphonate, and other phosphorus monomers; alkylaminoalkyl(meth)acrylates or quaternization products thereof (e.g., 2-(N,N-dimethylamino)ethyl(meth)acrylate, 3-(N,N-dimethylamino) propyl (meth)acrylate, 2-(N,N,N-trimethylammonium)ethyl (meth)acrylate chloride); allyl esters of $C_1$-$C_{30}$ monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine).

The monomers can further include cross-linking monomers, such as hydrazides (e.g., adipic dihydrazide); divinylbenzene; methacrylic acid anhydride; monomers containing 1,3-diketo groups (e.g., diacetone acrylamide); monomers containing urea groups (e.g., acrylamidoglycolic acid and methacrylamidoglycolate methyl ether); and silane crosslinkers (e.g., 3-methacryloxypropyl trimethoxysilane and 3-mercaptopropyl trimethoxysilane). Additional examples of crosslinkers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; monomers containing two alkenyl radicals; and monomers containing two non-conjugated ethylenically unsaturated double bonds (e.g., diallyl maleate, diallyl fumarate, and methylenebisacrylamide).

In some embodiments, the acrylic-based copolymer can further include vinyl aromatic monomers (e.g., styrenes). For example, the acrylic-based copolymers can be derived from less than 5% of styrene (e.g., 4% or less, 3% or less, 2% or less, or 1% or less) based on the total weight of the monomers. In some examples, the acrylic-based copolymer is substantially free of vinyl aromatic monomers (e.g., styrenes). For example, the acrylic-based copolymer can be derived from less than 0.9%, less than 0.5%, 0.1%, less than 0.01%, or 0% vinyl aromatic monomers based on the total weight of the monomers.

In some examples, the acrylic-based copolymer is derived from less than 15% by weight of one or more of acrylonitrile, methacrylonitrile, vinylbenzonitrile, cyanoacrylates, vinyl chloride, vinylidene chloride, and cyano-styrenes. For example, the acrylic-based copolymer can be derived from less than 10%, less than 5%, less than 4%, less than 3%, less than 2%, or less than 1% of these monomers. In some examples, the acrylic-based copolymer is substantially free from these monomers.

As described above, the acrylic-based copolymer is also derived from at least one copolymerizable surfactant. In some embodiments, the acrylic-based copolymer is derived from greater than 0.5% by weight of the at least one copolymerizable surfactant. For example, the at least one copolymerizable surfactant can be included in an amount from greater than 1% by weight, greater than 1.5% by weight, greater than 2% by weight, greater than 2.5% by weight, greater than 3% by weight, greater than 3.5% by weight, greater than 4% by weight, or greater than 4.5% by weight based on the total weight of the monomers. In some embodiments, the total amount of copolymerizable surfactant added to the copolymer does not react in the polymerization reaction. For example, 5% or less (e.g., 4% or less, 3% or less, 2% or less, 1% or less, or 0.5% or less) of the added copolymerizable sulfate surfactant can remain unreacted.

In some examples, the at least one copolymerizable surfactant can have a structure represented by Formula I or a salt thereof.

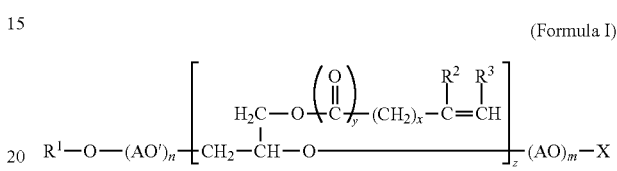

(Formula I)

In Formula I, $R^1$ represents a branched aliphatic hydrocarbon group, a secondary aliphatic hydrocarbon group, or a branched aliphatic acyl group. Also in Formula I, AO and AO' each independently represents an oxyalkylene group having 2 to 4 carbon atoms. Additionally in Formula I, $R^2$ and $R^3$ each independently represents a hydrogen atom or a methyl group. Further in Formula I, x stands for a number of from 0 to 12, y stands for a number of 0 to 1, z stands for a number of from 1 to 10, m stands for a number of from 0 to 1,000, and n stands for a number of from 0 to 1,000. Also in Formula I, X represents a hydrogen atom or an ionic hydrophilic group.

In some embodiments, the copolymerizable surfactant can have the following structure represented by Structure I-A:

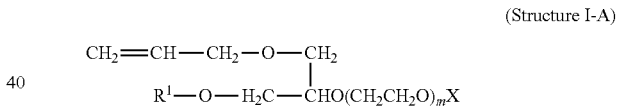

(Structure I-A)

In Structure I-A, $R^1$ is C9-C15 alkyl or C7-C11 alkyl-phenyl, X is H, $SO_3NH_4$, and/or $SO_3Na$, and m is 3 to 50. In some embodiments, $R^1$ is C10-C14 alkyl, X is H and/or $SO_3NH_4$, and m is 5 to 40. In some embodiments, m is 5 to 25, 5 to 20, or 5 to 15 (e.g., m=10). Exemplary copolymerizable surfactants wherein $R^1$ is C10-C14 alkyl can include ADEKA REASOAP series ER and SR surfactants (Adeka Corporation; Tokyo, Japan), such as ER-10, ER-20, ER-30, ER-40, SR-10, SR-20, and SR-1025. For example, ADEKA REASOAP SR-10, which includes ammonium salts of poly(oxy-1,2-ethanediyl), alpha-sulfo-omega-[1-(hydroxymethyl)-2-(2-propenyloxy)ethoxy]-, C11-rich, C10-14-branched alkyl ethers, can be used. Exemplary copolymerizable surfactants in which $R^1$ is C7-C11 alkyl-phenyl can include ADEKA REASOAP series NE and SE surfactants, such as NE-10, NE-20, NE-30, NE-40, NE-50, SE-10N, SE-20N, and SE-1025N.

Further examples of suitable copolymerizable surfactants include MAXEMUL surfactants, alkenyl functional non-ionic surfactants commercially available from Croda Coatings & Polymers (Edison, N.J.) and HITENSOL BC surfactants, a series of polyoxyethylene alkylphenyl ether ammonium sulfates commercially available from Dai-Ichi Kogyo Seiyaku Co., Ltd. (Kyoto, Japan). Additional examples of suitable copolymerizable surfactants are described in U.S. Pat. No. 6,841,655, which is hereby incorporated by reference in its entirety.

In addition to the monomers and copolymerizable surfactants, small amounts (e.g., from greater than 0% by weight to 0.3% by weight) of molecular weight regulators, such as tert-dodecyl mercaptan, can be used. Such regulators can be added to the polymerization zone in a mixture with the monomers to be polymerized and are considered part of the total amount of monomers used in the copolymer.

In some embodiments, the acrylic-based copolymer can be derived from 20-60% by weight methyl methacrylate, 20-60% by weight butyl acrylate, 0-5% by weight acid monomers, 0-5% by weight amide monomers, 0-8% by weight crosslinkable (meth)acrylate monomers, 0-0.3% by weight molecular weight regulators, and greater than 0 to 10% copolymerizable surfactant. In some embodiments, the acrylic-based copolymer can be derived from monomers consisting essentially of 20-60% by weight methyl methacrylate, 20-60% by weight butyl acrylate, 0-5% by weight acid monomers, 0-5% by weight amide monomers, 0-8% by weight crosslinkable (meth)acrylate monomers, 0-0.3% by weight molecular weight regulators, and greater than 0 to 10% copolymerizable surfactant. In some embodiments, the acrylic-based copolymer can be derived from 40-50% by weight methyl methacrylate, 40-55% by weight butyl acrylate, greater than 0 to 5% by weight acid monomers, 0-5% by weight amide monomers, 0-8% by weight crosslinkable (meth)acrylate monomers, 0-0.3% by weight molecular weight regulators, and 1 to 10% copolymerizable surfactant. The acid monomers can include, for example, 0-2.5% by weight acrylic acid and 0-2.5% by weight itaconic acid.

The acrylic-based copolymers can be prepared by polymerizing the monomers using free-radical emulsion polymerization. The emulsion polymerization temperature is generally from 30° C. to 95° C. or from 75° C. to 90° C. The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient. In some embodiments, the copolymerizable surfactant to be used can be provided initially in the polymerization zone in dissolved form in an aqueous mixture.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium peroxydisulfates), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

Groups of monomers can be added to the polymerization reaction in two phases to form a multiphase particle with a core phase and a shell phase. The ratios and amounts of monomers present in each phase can vary. For example, the ratio of butyl acrylate to methyl methacrylate in the core phase can be 1:1.5 to 5:1 while the ratio of butyl acrylate to methyl methacrylate in the shell phase can be 0 to 1:2. In some embodiments, the core phase can be prepared by including in the reactor 1.0-5.0 parts by weight of the copolymerizable surfactant (e.g. ADEKA REASOAP SR-1025), 0.5-2.0 parts by weight of the phosphate ester surfactant (e.g. DEXTROL OC-40 or MAPHOS 36P), 10-30 parts by weight methyl methacrylate, 20-50 parts by weight butyl acrylate, 0-5.0 parts by weight of an acid monomer (e.g. itaconic acid) and 0-8.0 parts by weight of a copolymerizable acrylate monomer (e.g. AAEM), and the shell phase can be prepared by then including in the reactor 0-5.0 parts by weight of the copolymerizable surfactant (e.g. ADEKA REASOAP SR-1025), 10-25 parts by weight methyl methacrylate, 0-5 parts by weight butyl acrylate, 0-5.0 parts by weight of an acid monomer (e.g. acrylic acid) and 0-8.0 parts by weight of a copolymerizable acrylate monomer (e.g. AAEM), and 0-0.3 parts by weight of a molecular weight regulator (e.g. tert-dodecyl mercaptan).

In some examples, the amount of (meth)acrylate monomers in each of the core phase and the shell phase is greater than 85% based on the weight of the monomers. For example, the amount of (meth)acrylate monomers in the core phase and/or the shell phase can be 86% by weight or greater, 87% by weight or greater, 88% by weight or greater, 89% by weight or greater, 90% by weight or greater, 91% by weight or greater, 92% by weight or greater, 93% by weight or greater, 94% by weight or greater, 95% by weight or greater, 96% by weight or greater, 97% by weight or greater, 98% by weight or greater, or 99% by weight of one or more (meth)acrylate monomers, based on the total weight of monomers.

As described above, the core phase can include a first polymer and the shell phase can include a second polymer. In some examples, the polymer in the core phase can have a $T_g$ of from −10 to 10° C. For example, the core phase can have a $T_g$ of greater than −10° C., greater than −9° C., greater than −8° C., greater than −7° C., greater than −6° C., greater than −5° C., greater than −4° C., greater than −3° C., greater than −2° C., or greater than −1° C. (e.g., 0° C.). The core phase can also have a $T_g$ of less than 10° C., less than 9° C., less than 8°

C., less than 7° C., less than 6° C., less than 5° C., less than 4° C., less than 3° C., less than 2° C., or less than 1° C. In some examples, the polymer in the shell phase can have a $T_g$ of from 60 to 100° C. For example, the shell phase can have a $T_g$ of greater than 60° C., greater than 65° C., greater than 70° C., or greater than 75° C. (e.g., 80° C.). The shell phase can also have a $T_g$ of less than 100° C., less than 95° C., less than 90° C., or less than 85° C. Alternatively, the core phase can have a $T_g$ of from 60 to 100° C. and the shell phase can have a $T_g$ of from −10 to 10° C. The multiphase polymer particles can have a median particle size of from 80 nm to 130 nm (e.g., from 90 nm to 120 nm or from 95 nm to 110 nm).

The multiphase polymer particles described herein can be combined with water to form an aqueous dispersion. In addition to the plurality of multiphase polymer particles, the aqueous dispersion further includes a C8-C18 alkyl alcohol alkoxylated phosphate ester surfactant. The amount of alkoxylated phosphate ester surfactant can range from 0.1% to 3% by weight (e.g., from 0.5 to 2% by weight) based on the solids of the dispersion. In some examples, the alkoxylated phosphate ester surfactant is a C12-C15 alkyl alcohol phosphate ester surfactant (e.g. a tridecyl alcohol phosphate ester surfactant). In some examples, the alkoxylated phosphate ester surfactant has from 1 to 60 alkoxylate groups or from 20 to 40 ethoxylate groups. The phosphate ester surfactant can be in free acid form or in salt form. Examples of suitable commercially available alkoxylated phosphate ester surfactant include DEXTROL OC-40, a free-acid form of a tridecyl alcohol ethoxylated phosphate ester available from Ashland Inc. (Covington, Ky.) and MAPHOS 36P, a tridecyl alcohol ethoxylated phosphate ester available from BASF Corporation (Florham Park, N.J.).

As described above, a percentage of the copolymerizable surfactant can remain unreacted. In these examples, the aqueous dispersion further includes the unreacted portion of the at least one copolymerizable surfactant.

In some embodiments, the aqueous dispersion is substantially free from non-polymerizable sodium sulfate surfactants. For example, the aqueous dispersions can include from less than 0.01% or 0% of non-polymerizable sodium sulfate surfactants based on the dry weight of the dispersions.

The aqueous dispersion can be used to prepare products, including coatings, adhesives, and caulks. For example, the aqueous dispersions described herein can be combined with one or more pigments in the coating composition. The term "pigment" as used herein includes non-film-forming solids such as extenders and fillers. The at least one pigment is preferably selected from the group consisting of $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable mixtures include blends of metal oxides such as those sold under the marks Minex® (oxides of silicon, aluminum, sodium and potassium commercially available from Unimin Specialty Minerals), Celites® (aluminum oxide and silicon dioxide commercially available from Celite Company), Atomites® (commercially available from English China Clay International), and Attagels® (commercially available from BASF Corporation). More preferably, the at least one pigment includes $TiO_2$, $CaCO_3$, or clay. Generally, the mean particle sizes of the pigments range from about 0.01 to about 50 microns. For example, the $TiO_2$ particles used in the aqueous coating composition typically have a mean particle size of from about 0.15 to about 0.40 microns. The pigment can be added to the aqueous coating composition as a powder or in slurry form. The pigment is preferably present in the aqueous coating composition in an amount from about 5 to about 50 percent by weight, more preferably from about 10 to about 40 percent by weight (i.e. the weight percentage of the pigment based on the total weight of the coating composition).

The coating composition can optionally contain conventional coating additives such as, for example, dispersants, additional surfactants (i.e. wetting agents), rheology modifiers, defoamers, thickeners, initiators (including photoinitiators), stabilizers, buffering agents, salts, preservatives, fire retardants, biocides, mildewcides, protective colloids, corrosion inhibitors, crosslinkers, crosslinking promoters, lubricants, colorants such as colored pigments and dyes, waxes, perfumes, co-solvents, and the like.

The optional additives may be used in a manner and amount as known in the art of conventional latex compositions, but the additives preferably do not increase the total VOC content of the composition above the preferred values provided herein. Thus, although the compositions can include anti-freeze agents and coalescing agents in an amount of 3% or less, 2% or less, 1% or less, or 0.5% or less, in some embodiments, the coating formulations are substantially free of anti-freeze agents and coalescing agents (e.g., include 0% of anti-freeze agents and coalescing agents). The coating formulations can have a VOC content of less than 100 g/l, less than 50 g/l, less than 10 g/l, less than 5 g/l, or less than 1 g/l, as determined according to ASTM Method D3960. In some examples, the coating formulations are substantially free of VOCs. In these embodiments, the coating formulations can be derived from less than 0.9%, less than 0.5%, 0.1%, less than 0.01%, or 0% of VOCs based on the total weight of the monomers.

The coating formulations described herein can be used to prepare clear and pigmented systems. In some examples, the coating formulations are used to produce flat, satin, or high gloss paint. The gloss of the coating formulations can be determined using a gloss meter (e.g., BYK Gardner Trigloss 4520; Bavaria, Germany) according to the ASTM Test Method for Specular Gloss (D523). Alternatively, the gloss of the coating formulation can be determined using goniophotometry. In some examples, suitable gloss numbers for flat paint at 85° can be, for example, from 0 to 7. Suitable gloss numbers for semi-gloss paint at 20° can range from 10 to 25. When measured at 60°, suitable gloss numbers for semi-gloss paint can range from 40 to 65. For high gloss paints, suitable gloss numbers can range from 40 to 60 when measured at 20° and from 70 to greater than 90 when measured at 60°. The coating formulations described herein also display water whitening resistance and low surfactant leaching properties.

The examples below are intended to further illustrate certain aspects of the methods and compositions described herein, and are not intended to limit the scope of the claims.

EXAMPLES

Example 1

Acrylic-Based Copolymer

An aqueous dispersion of multiphase polymer particles is prepared by combining multiphase particles including an acrylic-based copolymer with an alkoxylated phosphate ester surfactant. Exemplary ingredients used to prepare the acrylic-based copolymer for use in the multiphase polymer particles described herein are shown in Table 1.

TABLE 1

| Ingredients | Parts by weight of copolymer |
|---|---|
| Methyl methacrylate | 20-55 |
| Butyl acrylate | 20-55 |
| Itaconic acid | 0-5 |
| Acrylic acid | 0-5 |
| Acetoacetoxyethyl methacrylate (AAEM) | 0-8 |
| Tert-dodecyl mercaptan | 0-0.3 |
| Copolymerizable sulfate surfactant | Greater than 0-5 |

The monomers (methyl methacrylate, butyl acrylate, itaconic acid, acrylic acid, and acetoacetoxyethyl methacrylate) and the copolymerizable sulfate surfactant are copolymerized in the presence of tert-dodecyl mercaptan to form multiphase polymer particles. Approximately 0.5 to 2% of the copolymerizable sulfate surfactant can remain unreacted.

Example 2

Aqueous Dispersion

An aqueous dispersion comprising multiphase polymer particles was prepared by copolymerizing monomers and the copolymerizable sulfate surfactant in the presence of tert-dodecyl mercaptan and a phosphate ester surfactant. The ingredients were copolymerized in two phases. The composition of each phase is shown in Table 2.

TABLE 2

| | Parts by weight of particle | |
|---|---|---|
| Ingredients | Phase 1 (Core) | Phase 2 (Shell) |
| Methyl methacrylate | 26 | 19.5 |
| Butyl acrylate | 46 | 1.9 |
| Itaconic acid | 0.5 | — |
| Acrylic acid | — | 1 |
| Acetoacetoxyethyl methacrylate (AAEM) | 2 | 4 |
| Tert-dodecyl mercaptan | — | 0.1 |
| Copolymerizable sulfate surfactant | 1 | 0.3 |
| Alkoxylated phosphate ester surfactant | 0.5 | — |

ADEKA REASOAP SR-1025 (Adeka Corporation; Tokyo, Japan) was used as the copolymerizable sulfate surfactant to prepare the multiphase polymer particles. DEXTROL OC-40 (Ashland Inc.; Covington, Ky.) was used as the phosphate ester surfactant. The $T_g$ of phase 1 was 0° C. and the $T_g$ of phase 2 was 80° C. The particle sizes of the resulting multiphase particles ranged from 80 to 130 nm.

Example 3

Water Whitening Test

The aqueous dispersion from Example 2 was prepared as a deep base coating formulation tinted with colored pigments at the rate of 12 oz pigment dispersion to 116 oz of paint and was applied at 250 microns to a black Leneta scrub panel P121-10N (The Leneta Company; Mahwah, N.J.). The panel was dried for 24 hours and a drop of water was then placed on the panel. After a few minutes, the panel was tilted and the water was allowed to run down the panel. The water whitening on the panel was determined, according to the ASTM D7190-10 method, based on the degree of color change on the tested portion of the panel two minutes after application and drying. The degree of color change was measured on a scale from 0 to 10, where 10 represented no water whitening. Additional tested parameters included the hydrophobicity of the surface as determined by how much the drop spread over the surface, the whiteness of the water trail upon tilting the panel, the rate at which the water spots dry, and the overall surfactant leaching or streaking left by the water trail. The coating formulation displayed minimal water whitening to the panel.

Example 4

Surfactant Leaching Test

The surfactant leaching test generally based on ASTM 7190 was performed approximately 24 hours after the water whitening test as described in Example 3. The panel was examined for "snail trails" left on the panel after the water dried. The coating formulation displayed no surfactant leaching.

The dispersions, formulations, and methods of the appended claims are not limited in scope by the specific dispersions, formulations, and methods described herein, which are intended as illustrations of a few aspects of the claims and any dispersions, formulations, and methods that are functionally equivalent are intended to fall within the scope of the claims. Various modifications of the dispersions, formulations, and methods in addition to those shown and described herein are intended to fall within the scope of the appended claims. Further, while only certain representative dispersion materials and method steps disclosed herein are specifically described, other combinations of the dispersion materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. An aqueous dispersion, comprising:
   a plurality of multiphase polymer particles, said multiphase particles comprising an acrylic-based copolymer derived from monomers comprising:
   20%-60% by weight methyl methacrylate;
   20%-60% by weight butyl acrylate;
   0%-5% by weight of one or more acid monomers;
   0%-5% by weight of one or more amide monomers;
   0%-8% by weight of one or more crosslinkable (meth) acrylate monomers;
   0%-0.3% by weight of one or more molecular weight regulators; and
   greater than 0% to 10% by weight of at least one copolymerizable surfactant or salt thereof; and
   a C8-C18 alkyl alcohol alkoxylated phosphate ester surfactant,
   wherein the multiphase particles comprise a core phase and a shell phase, and
   wherein the core phase and the shell phase differ in composition.

2. The aqueous dispersion according to claim 1, wherein the acrylic-based copolymer is derived from greater than 0.5% by weight of the at least one copolymerizable surfactant or salt thereof.

3. The aqueous dispersion according to claim 1, wherein the at least one copolymerizable surfactant is of formula I, or a salt thereof:

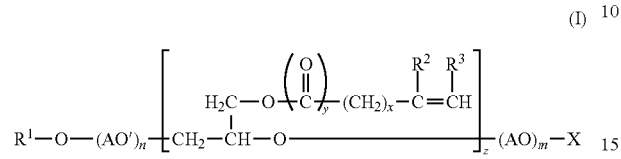

(I)

wherein $R^1$ represents a branched aliphatic hydrocarbon group, a secondary aliphatic hydrocarbon group or a branched aliphatic acyl group, AO and AO' each independently represents an oxyalkylene group having 2 to 4 carbon atoms, $R^2$ and $R^3$ each independently represents a hydrogen atom or a methyl group, x stands for a number of from 0 to 12, y stands for a number of 0 to 1, z stands for a number of from 1 to 10, X represents a hydrogen atom or an ionic hydrophilic group, m stands for a number of from 0 to 1,000, and n stands for a number of from 0 to 1,000.

4. The aqueous dispersion according to claim 1, wherein the alkoxylated phosphate ester surfactant is a C12-C15 alkyl alcohol phosphate ester surfactant having from 1 to 70 alkoxylate groups.

5. The aqueous dispersion according to claim 3, wherein the alkoxylated phosphate ester surfactant is a tridecyl alcohol phosphate ester surfactant having from 10 to 40 ethoxylate groups.

6. The aqueous dispersion according to claim 1, wherein the alkoxylated phosphate ester surfactant is in free acid form.

7. The aqueous dispersion according to claim 1, wherein the acrylic-based copolymer is derived from greater than 85% to less than 100% by weight of the methyl methacrylate and butyl acrylate combined.

8. The aqueous dispersion according to claim 1, wherein the acrylic-based copolymer is derived from greater than 0% by weight to 5% by weight of said one or more acid monomers.

9. The aqueous dispersion according to claim 1, wherein the acrylic-based copolymer is derived from greater than 0% by weight to 8% by weight of the one or more crosslinkable (meth)acrylate monomers, and the one or more crosslinkable (meth)acrylate monomers include acetoacetoxyethyl methacrylate.

10. The aqueous dispersion according to claim 1, wherein the acrylic-based copolymer is derived from greater than 0% by weight to 5% by weight of one or more amide monomers.

11. The aqueous dispersion according to claim 1, wherein the acrylic-based copolymer is derived from greater than 0% by weight to 0.3% by weight of one or more molecular weight regulators, and said one or more molecular weight regulators include tert-dodecyl mercaptan.

12. The aqueous dispersion according to claim 1, wherein the acrylic-based copolymer is derived from:
40%-50% by weight methyl methacrylate;
40%-55% by weight butyl acrylate;
greater than 0% to 5% by weight of the one or more acid monomers;
0%-5% by weight of the one or more amide monomers;
0%-8% by weight of the one or more crosslinkable (meth)acrylate monomers;
0%-0.3% by weight of the one or more molecular weight regulators; and
1% to 10% of the at least one copolymerizable surfactant.

13. The aqueous dispersion according to claim 12, wherein the one or more acid monomers include at least one of acrylic acid and itaconic acid such that the one or more acid monomers include 0%-2.5% by weight acrylic acid and 0%-2.5% by weight itaconic acid.

14. The aqueous dispersion according to claim 1, wherein the core phase includes the acrylic-based copolymer.

15. An aqueous dispersion, comprising:
a plurality of multiphase polymer particles, said multiphase particles comprising an acrylic-based copolymer derived from monomers comprising:
methyl methacrylate;
butyl acrylate;
optionally one or more additional (meth)acrylate monomers;
optionally one or more acid monomers;
optionally one or more amide monomers;
optionally one or more molecular weight regulators; and
at least one copolymerizable surfactant or salt thereof; and
a C8-C18 alkyl alcohol alkoxylated phosphate ester surfactant,
wherein the multiphase particles comprise a core phase and a shell phase,
wherein the core phase and the shell phase differ in composition,
wherein a ratio of butyl acrylate to methyl methacrylate in the core phase is 1:1.5 to 5:1, and
wherein a ratio of butyl acrylate to methyl methacrylate in the shell phase is 0 to 1:2.

16. The aqueous dispersion according to claim 15, wherein the core phase has a $T_g$ of $-20°$ C. to $30°$ C. and the shell phase has a $T_g$ of $60°$ C. to $100°$ C.

17. An aqueous dispersion, comprising:
a plurality of multiphase polymer particles, said multiphase particles comprising an acrylic-based copolymer derived from monomers comprising:
20%-60% by weight methyl methacrylate;
20%-60% by weight butyl acrylate;
0%-5% by weight of one or more acid monomers;
0%-5% by weight of one or more amide monomers;
0%-8% by weight of one or more crosslinkable (meth) acrylate monomers;
0%-0.3% by weight of one or more molecular weight regulators; and
greater than 0% to 10% by weight of at least one copolymerizable surfactant or salt thereof; and
a C8-C18 alkyl alcohol alkoxylated phosphate ester surfactant, and
further comprising an unreacted portion of the at least one copolymerizable surfactant or salt thereof.

18. A coating formulation comprising:
an aqueous dispersion comprising:
a plurality of multiphase polymer particles, said multiphase particles comprising an acrylic-based copolymer derived from monomers comprising:
20%-60% by weight methyl methacrylate;
20%-60% by weight butyl acrylate;
0%-5% by weight of one or more acid monomers;
0%-5% by weight of one or more amide monomers;
0%-8% by weight of one or more crosslinkable (meth)acrylate monomers;

0%-0.3% by weight of one or more molecular weight regulators; and greater than 0% to 10% by weight of at least one copolymerizable surfactant or salt thereof; and a C8-C18 alkyl alcohol alkoxylated phosphate ester surfactant, and one or more pigments, wherein the multiphase particles comprise a core phase and a shell phase, wherein the core phase and the shell phase differ in composition, and wherein the coating formulation is a satin or high gloss paint.

19. The coating formulation according to claim 18, wherein the one or more pigments include one or more of calcium carbonate, clay, and titanium dioxide.

20. The coating formulation according to claim 18, wherein the coating formulation comprises less than 100 g/l volatile organic compounds.

21. The coating formulation according to claim 18, wherein the coating formulation comprises less than 50 g/l volatile organic compounds.

22. An aqueous dispersion, comprising:
a plurality of multiphase polymer particles, said multiphase particles comprising an acrylic-based copolymer derived from monomers comprising:
20%-60% by weight methyl methacrylate;
20%-60% by weight butyl acrylate;
0%-5% by weight of one or more acid monomers;
0%-5% by weight of one or more amide monomers;
0%-8% by weight of one or more crosslinkable (meth)acrylate monomers;
0%-0.3% by weight of one or more molecular weight regulators;
greater than 0% to less than 5% styrene; and
greater than 0% to 10% by weight of at least one copolymerizable surfactant or salt thereof; and
a C8-C18 alkyl alcohol alkoxylated phosphate ester surfactant.

23. A method of producing an aqueous dispersion comprising a plurality of multiphase copolymer particles, comprising
preparing a copolymer by polymerizing monomers comprising:
20%-60% by weight methyl methacrylate;
20%-60% by weight butyl acrylate;
0%-5% by weight of one or more acid monomers;
0%-5% by weight of one or more amide monomers;
0%-8% by weight of one or more crosslinkable (meth)acrylate monomers;
0%-0.3% by weight of one or more molecular weight regulators; and
greater than 0% to 10% by weight of at least one copolymerizable surfactant or salt thereof, in an aqueous medium, wherein said polymerizing step occurs in more than one phase so as to form the multiphase particles, wherein the multiphase particles comprise a core phase and a shell phase, and wherein the core phase and the shell phase differ in composition; and
adding a C8-C18 alkyl alcohol alkoxylated phosphate ester surfactant to the aqueous medium.

24. A method of producing an aqueous dispersion comprising a plurality of multiphase copolymer particles, comprising
preparing a copolymer by polymerizing monomers comprising:
20%-60% by weight methyl methacrylate;
20%-60% by weight butyl acrylate;
0%-5% by weight of one or more acid monomers;
0%-5% by weight of one or more amide monomers;
0%-8% by weight of one or more crosslinkable (meth)acrylate monomers;
0%-0.3% by weight of one or more molecular weight regulators;
greater than 0% to less than 5% styrene; and
greater than 0.5% to 10% by weight of at least one copolymerizable surfactant or salt thereof, in an aqueous medium, wherein said polymerizing step occurs in more than one phase; and
adding a C8-C18 alkyl alcohol alkoxylated phosphate ester surfactant to the aqueous medium.

25. The aqueous dispersion according to claim 1, wherein the acrylic-based copolymer is derived from monomers consisting essentially of:
20%-60% by weight methyl methacrylate;
20%-60% by weight butyl acrylate;
0%-5% by weight of one or more acid monomers;
0%-5% by weight of one or more amide monomers;
0%-8% by weight of one or more crosslinkable (meth)acrylate monomers;
0%-0.3% by weight of one or more molecular weight regulators; and
greater than 0% to 10% by weight of at least one copolymerizable surfactant or salt thereof.

26. The aqueous dispersion according to claim 15, wherein the acrylic-based copolymer is derived from monomers consisting essentially of:
methyl methacrylate;
butyl acrylate;
optionally one or more additional (meth)acrylate monomers;
optionally one or more acid monomers;
optionally one or more amide monomers;
optionally one or more molecular weight regulators; and
at least one copolymerizable surfactant or salt thereof.

27. The method according to claim 23, wherein the preparing step comprises preparing a copolymer by polymerizing monomers consisting essentially of:
20%-60% by weight methyl methacrylate;
20%-60% by weight butyl acrylate;
0%-5% by weight of one or more acid monomers;
0%-5% by weight of one or more amide monomers;
0%-8% by weight of one or more crosslinkable (meth)acrylate monomers;
0%-0.3% by weight of one or more molecular weight regulators; and
greater than 0% to 10% by weight of at least one copolymerizable surfactant or salt thereof.

28. The aqueous dispersion according to claim 1, wherein the core phase and the shell phase are derived from different combinations of monomers.

29. The aqueous dispersion according to claim 1, wherein the core phase and the shell phase are derived from the same combination of monomers which are in different ratios in the core phase and the shell phase.

30. The aqueous dispersion according to claim 1, wherein the core phase and the shell phase have different $T_g$ values.

31. The aqueous dispersion according to claim 30, wherein the core phase has a $T_g$ of $-20°$ C. to $30°$ C. and the shell phase has a $T_g$ of $60°$ C. to $100°$ C.

* * * * *